(12) United States Patent
Mak

(10) Patent No.: US 7,637,987 B2
(45) Date of Patent: Dec. 29, 2009

(54) CONFIGURATIONS AND METHODS OF ACID GAS REMOVAL

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 551 days.

(21) Appl. No.: 10/511,408

(22) PCT Filed: Dec. 11, 2003

(86) PCT No.: PCT/US03/39776

§ 371 (c)(1),
(2), (4) Date: Apr. 8, 2005

(87) PCT Pub. No.: WO2004/052511

PCT Pub. Date: Jun. 24, 2004

(65) Prior Publication Data

US 2005/0172807 A1    Aug. 11, 2005

Related U.S. Application Data

(60) Provisional application No. 60/433,257, filed on Dec. 12, 2002.

(51) Int. Cl.
*B01D 53/14* (2006.01)

(52) U.S. Cl. .............................. 95/160; 95/164; 95/169; 95/175; 95/235; 95/236; 96/234

(58) Field of Classification Search .................. 95/263, 95/266, 235, 236, 160, 163, 164, 169, 172, 95/175; 423/223, 224, 226, 232, 234; 96/234
See application file for complete search history.

(56) References Cited

U.S. PATENT DOCUMENTS

| | | | | | |
|---|---|---|---|---|---|
| 3,301,778 | A | * | 1/1967 | Cabbage | 208/355 |
| 3,375,639 | A | * | 4/1968 | Miller et al. | 96/181 |
| 3,435,590 | A | * | 4/1969 | Smith | 95/174 |
| 3,594,985 | A | * | 7/1971 | Ameen et al. | 95/163 |
| 3,664,091 | A | * | 5/1972 | Hegwer | 95/161 |
| 3,841,382 | A | * | 10/1974 | Gravis et al. | 159/16.1 |
| 4,080,424 | A | * | 3/1978 | Miller et al. | 423/223 |
| 5,061,465 | A | * | 10/1991 | Carter | 423/229 |
| 7,192,468 | B2 | * | 3/2007 | Mak et al. | 95/160 |

OTHER PUBLICATIONS www.environmental-expert.com/STSE_resulteach_prodcut.aspx?cid.*

* cited by examiner

*Primary Examiner*—Duane Smith
*Assistant Examiner*—Ives Wu
(74) *Attorney, Agent, or Firm*—Fish & Associates, PC

(57) ABSTRACT

A plant includes a vacuum stripper (118) that receives a lean hydrogen sulfide-containing physical solvent (32) and in which substantially hydrogen sulfide-free stripping gas (51, 52) is provided by at least one of a high-pressure flash vessel (110) and a medium pressure flash vessel (112). Contemplated configurations advantageously extend the range of use for physical solvents to treat sour gas comprising carbon dioxide and hydrogen sulfide, and can be used to meet most pipeline specification of 4 ppm hydrogen sulfide.

17 Claims, 2 Drawing Sheets

US 7,637,987 B2

CONFIGURATIONS AND METHODS OF ACID GAS REMOVAL

This application claims the benefit of U.S. provisional patent application with the Ser. No. 60/433,257, which was filed Dec. 12, 2002, and which is incorporated by reference herein.

FIELD OF THE INVENTION

The field of the invention is removal of acid gases from a feed gas, and particularly relates to acid gas removal from high carbon dioxide and hydrogen sulfide content feed gas.

BACKGROUND OF THE INVENTION

Acid gas removal from various gas streams, and especially removal of carbon dioxide from natural gas streams has become an increasingly important process as the acid gas content of various gas sources is relatively high, or increases over time. For example, various natural gas sources in Alaska, continental North America, Norway, Southeast Asia, or in the gulf of Mexico contain carbon dioxide ranging from about 20% to about 75%. Furthermore, acid gas from various gas fields also contains hydrogen sulfide at significant concentrations that typically needs to be removed to meet pipeline quality specifications.

For example, in one commonly employed process for acid gas removal, a chemical solvent (e.g., an amine solvent) is used for acid gas removal, which typically requires additional processing of the isolated acid gas in a sulfur plant to convert the hydrogen sulfide from the regenerated solvent into sulfur as a byproduct. Such acid gas removal and sulfur plant combinations are generally energy intensive and costly. Moreover, in today's diminishing sulfur market the so produced sulfur is only of little commercial value and is consequently disposed of, which still further increases cost for such operations.

Alternatively, membrane systems may be employed to physically separate the acid gas from a gaseous feed stream. Membrane systems are often highly adaptable to accommodate treatment of various gas volumes and product-gas specifications. Furthermore, membrane systems are relatively compact and are generally free of moving parts, therefore rendering such systems an especially viable option for off-shore gas treatment. However, all or almost all single stage membrane separators are relatively non-selective and therefore produce a carbon dioxide permeate stream with a relatively high methane and hydrocarbon content (which is either vented, incinerated, or used as a low BTU fuel gas). Consequently, the relatively high methane and hydrocarbon losses often render the use of this process undesirable and uneconomical. To reduce such losses, multiple stages of membrane separators with inter-stage recompression may be used. However, such systems are often energy intensive and costly.

In yet another example, a physical solvent is employed for removal of acid gas from a feed gas, which is particularly advantageous for treating gas with a high acid gas partial pressure as the potential treating capacity of the physical solvent increases with the acid gas partial pressure (Henry's law). Using physical solvents, absorption of a particular acid gas predominantly depends upon the particular solvent employed, and is further dependent on pressure and temperature of the solvent. For example, methanol may be employed as a low-boiling organic physical solvent, as exemplified in U.S. Pat. No. 2,863,527 to Herbert et al. However, the refrigerant cooling requirement to maintain the solvent at cryogenic temperatures is relatively high, and the process often exhibits greater than desired methane and ethane absorption, thereby necessitating large energy input for recompression and recovery.

A typical physical solvent process is exemplified in Prior Art FIG. 1, which is conceptually relatively simple and employs use of a cold lean solvent to remove carbon dioxide from the feed gas. The solvent is regenerated by successive flashing to lower pressures and the flashed solvent is then pumped to the absorber, wherein the solvent is cooled using external refrigeration (either in the rich solvent or the lean solvent circuit). In most instances, a steam or fuel fired heater is required for solvent regeneration.

Physical solvent processes are generally advantageous for bulk acid gas removal (e.g., the treated gas has 1 to 2% remaining acid gas). However, it is often difficult to remove sour gases, and particularly hydrogen sulfide, to levels that meet pipeline gas quality. Moreover, typical conventional processes require regeneration of the solvent with heat or steam, which tends to be relatively energy intensive. Without application of heat for solvent regeneration, currently known flash regeneration processes will not produce a sufficiently lean solvent for gas treating to meet the pipeline specification for hydrogen sulfide.

Thus, although various configurations and methods are known to remove acid gases from a feed gas, all or almost all of them suffer from one or more disadvantages. Among other things, hydrogen sulfide levels in the treated gases are often unacceptably high for current standards, and without further processing, the treated gas can often not meet the pipeline specifications. Furthermore, known processes tend to require substantial amounts of energy to reduce the acid gas concentration to pipeline standards and incur significant hydrocarbon losses. Therefore, there is still a need to provide improved methods and configurations for acid gas removal.

SUMMARY OF THE INVENTION

The present invention is directed to configurations and methods of removing acid gases from a feed gas using a physical solvent, in which the solvent is regenerated to an ultra-lean solvent using a substantially hydrogen sulfide-free stripping gas to the vacuum stripper.

Therefore, in one particularly preferred aspect of the inventive subject matter, a plant will include a vacuum stripper that is configured to produce an ultra-lean physical solvent from a lean hydrogen sulfide-containing physical solvent. Contemplated plants will further include a high-pressure flash vessel and/or a medium pressure flash vessel that provide a substantially hydrogen sulfide-free stripping gas to the vacuum stripper.

Further contemplated plants include an absorber that operates with an isothermal gradient or with a decreasing top-to-bottom thermal gradient, and that receives a feed gas comprising at least 10 mol % carbon dioxide and at least 500 ppm hydrogen sulfide (typically at least partially dehydrated, and/or at a pressure of at least 1000 psig). With respect to the hydrogen sulfide content of the solvents, it is generally contemplated that the lean hydrogen sulfide-containing physical solvent comprises at least 100 ppm hydrogen sulfide, and that the ultra-lean physical solvent comprises less than 100 ppm (and most typically less than 10 ppm) hydrogen sulfide. The substantially hydrogen sulfide-free stripping gas preferably comprises at least 95 mol % carbon dioxide.

In further contemplated aspects of the inventive subject matter, the plant may also include a separator in which acid gas is separated from a rich solvent, thereby producing the lean hydrogen sulfide-containing physical solvent (wherein part of the acid gas is compressed and injected into a formation). Additionally, the vacuum stripper may further produce a second acid gas that is combined with the acid gas from the separator.

Consequently, a method of producing an ultra-lean physical solvent may include one step in which a substantially hydrogen sulfide-free stripping gas is separated from a physical solvent in at least one of a high-pressure flash vessel and a medium pressure flash vessel. In another step, hydrogen sulfide is stripped from a lean hydrogen sulfide-containing physical solvent in a vacuum stripper to form the ultra-lean physical solvent. With respect to the various configurations and other operational parameters, the same considerations as described above apply.

Various objects, features, aspects and advantages of the present invention will become more apparent from the following detailed description of preferred embodiments of the invention.

DETAILED DESCRIPTION

Figure 1:
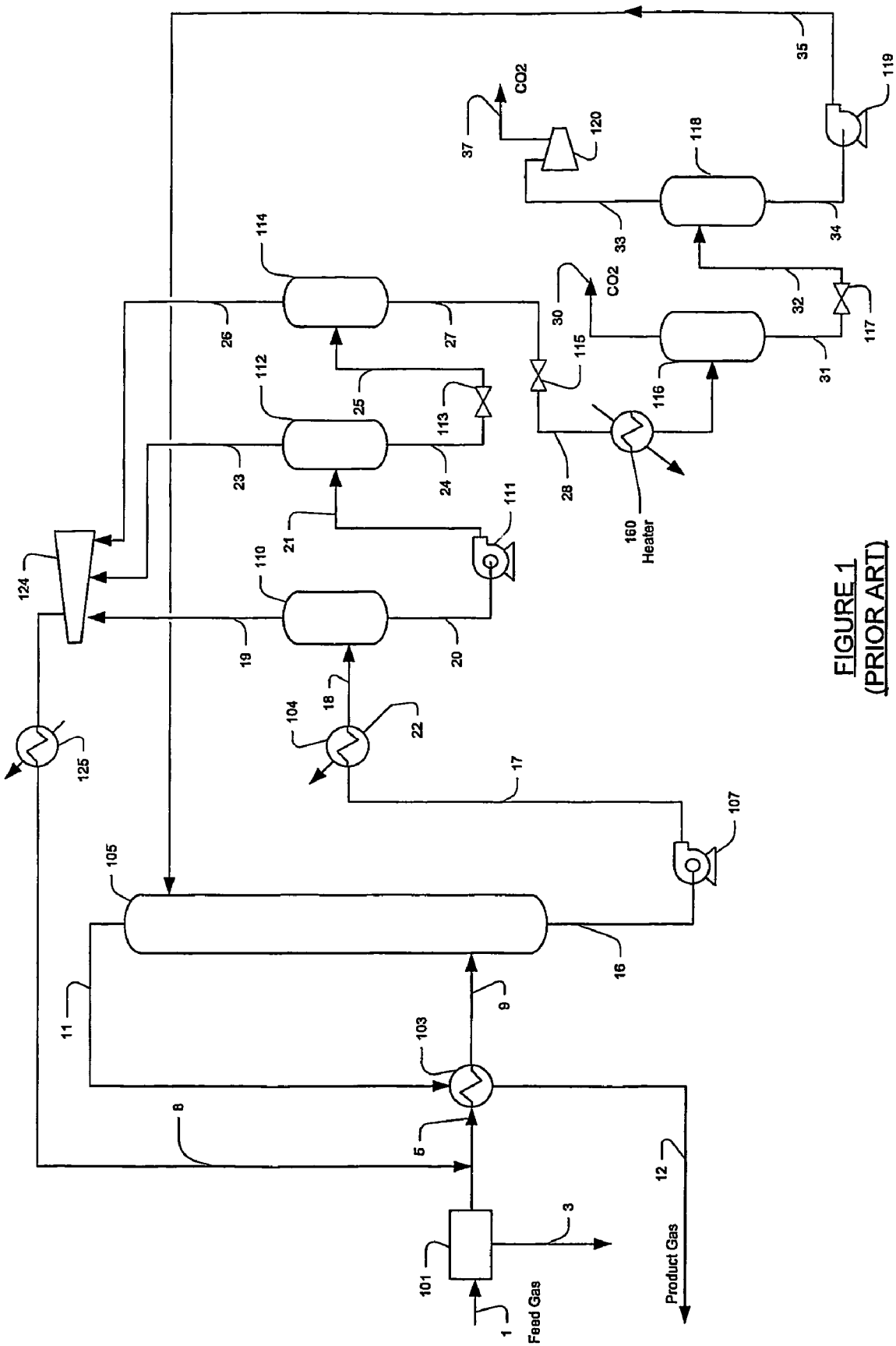
FIG. 1 is a prior art schematic for acid gas removal using a physical solvent.

The inventors have discovered that acid gases, and particularly carbon dioxide, is removed from a feed gas comprising carbon dioxide and hydrogen sulfide in configurations and methods in which flashed gases from the feed gas are employed to strip hydrogen sulfide from a lean physical solvent that is employed to also remove carbon dioxide.

In particularly preferred configurations, it is contemplated that a stripper operates under vacuum pressure (typically between about 1 to 10 psia), wherein the stripping gas is supplied from the high pressure and medium pressure flash in the solvent regeneration process. It is further preferred that the conditions in the high pressure and medium pressure flash and the quantities of the flashed gases are preferably selected such that the flash gases contain mostly light hydrocarbons and some carbon dioxide, but are substantially free (i.e., less than 1000 ppm, typically less than 100 ppm, and more typically less than 10 ppmv of hydrogen sulfide. Thus, it should be recognized that the vacuum stripper can produce a lean solvent that is depleted of hydrogen sulfide (i.e., less than 10 ppm) and suitable for treating the sour gas to a low hydrogen sulfide level.

As used herein, the term "isothermal gradient" in conjunction with a physical solvent in an absorber means that the temperature of the physical solvent in an upper portion of the absorber is substantially identical (i.e., absolute deviation of temperature no more than 10° F.) with the temperature of the physical solvent in a middle and lower portion of the absorber. Similarly, the term "decreasing top-to-bottom thermal gradient" as used herein means that the temperature of the physical solvent in an upper portion of the absorber is higher than the temperature of the physical solvent in a middle and/or lower portion of the absorber.

As further used herein, and with respect to a column or absorber, the terms "upper" and "lower" should be understood as relative to each other. For example, withdrawal or addition of a stream from an "upper" portion of a column or absorber means that the withdrawal or addition is at a higher position (relative to the ground when the column or absorber is in operation) than a stream withdrawn from a "lower" region of the same column or absorber. Viewed from another perspective, the term "upper" may thus refer to the upper half of a column or absorber, whereas the term "lower" may refer to the lower half of a column or absorber. Similarly, where the term "middle" is used, it is to be understood that a "middle" portion of the column or absorber is intermediate to an "upper" portion and a "lower" portion. However, where "upper", "middle", and "lower" are used to refer to a column or absorber, it should not be understood that such column is strictly divided into thirds by these terms.

As still further used herein, the term "about" when used in conjunction with numeric values refers to an absolute deviation of less or equal than 10% of the numeric value, unless otherwise stated. Therefore, for example, the term "about 10 mol %" includes a range from 9 mol % (inclusive) to 11 mol % (inclusive).

Figure 2:
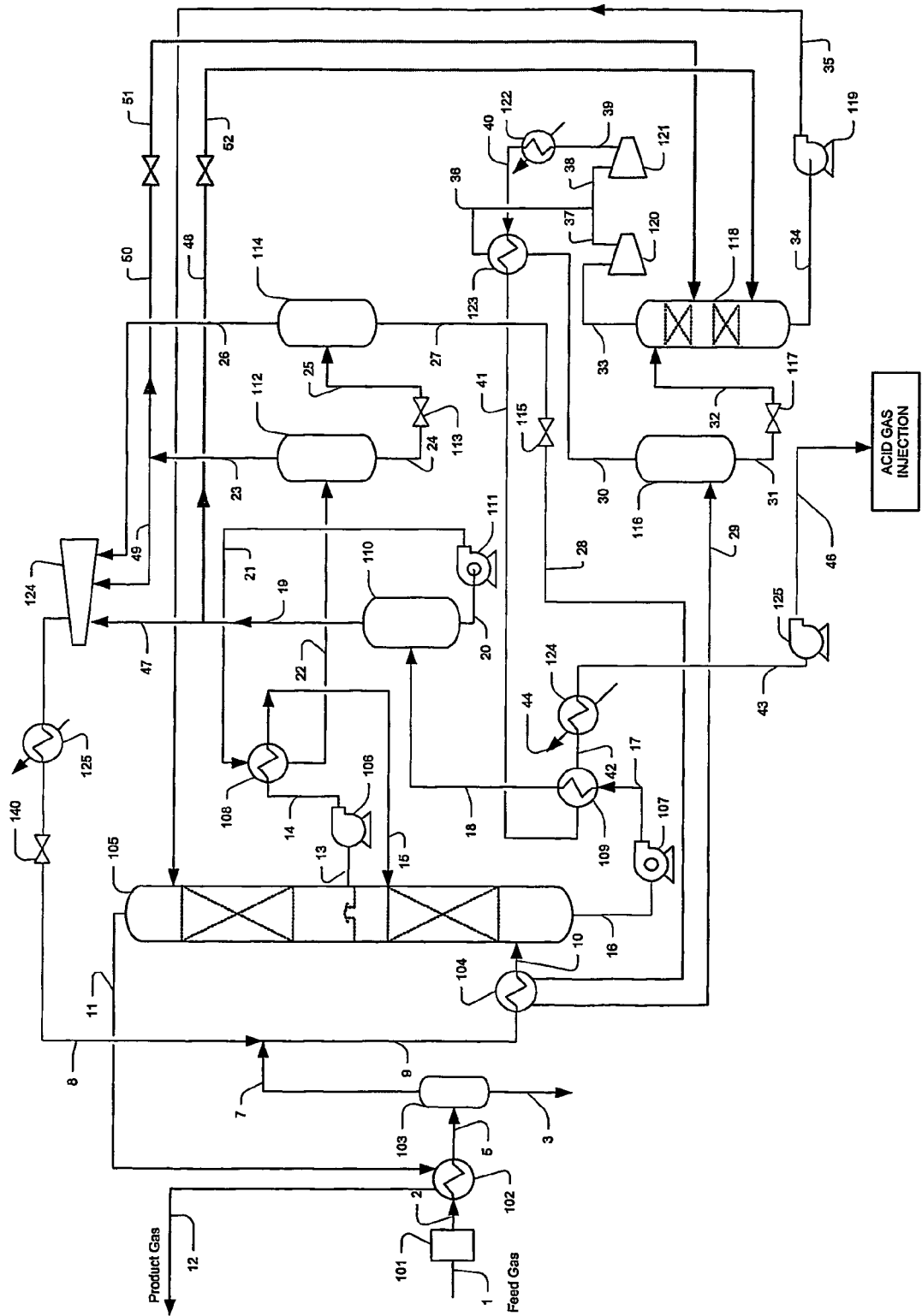
FIG. 2 is an exemplary schematic of a plant configuration for acid gas removal according to the inventive subject matter.

In a preferred configuration as depicted in FIG. 2, an exemplary plant comprises a gas dehydration unit 101 (typically TEG or molecular sieve unit) that removes water content from feed gas 1 to a water dewpoint of about −40° F. forming dried gas stream 2. It is particularly preferred that the treated feed gas stream 2 is further cooled (typically to −10° F. to 30° F.) in a heat exchanger 102 using absorber overhead stream 11 as a refrigerant to form cooled treated feed gas stream 5, which is separated in separator 103 into liquid stream 3 and vapor stream 7. Stream 3 contains most of the C5+ components that can be further recovered as marketable NGL product. Stream 7, depleted of C5+ components is mixed with combined recycle stream 8 to form stream 9 that is further cooled in heat exchanger 104. In this configuration, heat exchanger 104 uses refrigeration provided by atmospheric depressurized rich solvent stream 28 and further cools stream 9 to typically −15° F. to −45° F., thereby forming cooled stream 10. The so cooled stream 10 enters the absorber 105 at a lower portion of the absorber.

It should be particularly appreciated that cooling of the treated feed gas stream to a relatively low temperature (e.g., about −15° F. to about −45° F.) will maintain the absorber bottom temperature at a particularly low level (e.g., about 0° F. to about −40° F.), which advantageously increases the acid gas loading of the rich solvent, and thereby reduces solvent circulation, methane, and/or hydrocarbons losses. It is further preferred that a side cooler 108 is employed to control and/or maintain the temperature of the lower section of the absorber 105 at a predetermined absorption temperature. In such configurations, the semi-rich solvent stream 13 (generated by absorption of acid gas in an upper portion of the absorber) is pumped by the side cooler pump 106 (via stream 14) and is cooled in side cooler 108 using flashed rich solvent stream 21 from hydraulic turbine 111 as refrigerant. The so cooled semi-lean solvent stream 15, at typically −10° F. to −40° F., is returned to the lower section of the absorber 105. It is further especially preferred that the refrigerant for the side cooler 108 is provided by the flashed rich solvent stream 20 (depressurized rich solvent stream) via hydraulic turbine 111. However, it should be recognized that cooling may also be provided by various other refrigerants, and suitable refrigerants may be internal (i.e., produced within the plant) or external (e.g., propane refrigeration).

Thus, suitable side coolers may advantageously be operated to maintain an optimum absorption temperature for effective absorption of the acid gas. Consequently, it should be recognized that in such configurations the middle portion of the absorber is preferably operated at a lower temperature than the upper portion of the absorber, which is particularly desirable when the solvent is loaded with acid gas (the solvent will typically exhibit lower viscosity and lower surface tension).

Once fed into the absorber, the semi-rich solvent 15 will then further absorb carbon dioxide from the feed gas, thereby forming rich solvent 16 that exits the absorber via first hydraulic turbine 107. First hydraulic turbine 107 reduces the absorber bottoms pressure to typically about half of the feed gas pressure, thus cooling the rich solvent to about −5° F. to −35° F. to form a depressurized rich solvent stream 17. It should be recognized that in such configurations the hydraulic turbine operates an energy efficient device as it generates refrigeration cooling by expansion and flashing of the acid gas content while providing shaft work to provide work (e.g., drive the solvent circulation pump).

The rich solvent 17, after heat exchanged with acid gas stream 41, is flashed to separator 110 which produces a first flashed hydrocarbon vapor stream 19, that is split into a recycle stream 47 and a stripping stream 48. Stream 47 is compressed by recycle compressor 124 and recovered in absorber 105, while stream 48 is letdown in pressure and fed to the vacuum stripper 118 as stream 52. With respect to the split ratio of streams 47 and 48, it is generally preferred that stream 48 accounts for about 5% to about 30% of the total flow of stream 19. The so flashed solvent stream 20 is further expanded in hydraulic turbine 111 to a pressure reduced by half to form an expanded rich solvent stream 21 (typically at −20° F. to −40° F.), which is used to cool the semi-rich solvent stream 14 in heat exchanger 108. The heated rich solvent 22 from heat exchanger 108, typically at 10° F. to −10° F., is separated in separator 112, which produces a second flashed hydrocarbon vapor stream 23 that is further split into a recycle stream 49 and a stripping stream 50. Stream 49 is compressed by recycle compressor 124 and recovered in absorber 105, while stream 50 is letdown in pressure and fed to the vacuum stripper 118 as stream 51. With respect to the split ratio between streams 49 and 50, it is generally preferred that stream 50 accounts for typically about 10% to about 50% of the total flow of stream 23. The flashed liquid stream 24 from separator 112 is further let down in pressure in an expansion JT valve 113 to typically reduced pressure by half, thereby chilling the rich solvent to 5° F. to −15° F. The so flashed solvent 25 is separated in separator 114 which produces a third flashed hydrocarbon vapor (third hydrocarbon recycle stream 26) to be recycled via recycle compressor 124. The power generated from the first and second hydraulic turbines 107 and 111 is preferably used to provide part of the power requirement of the lean solvent pump 119, vacuum pump 120, and/or for power generation.

The flashed liquid 27 from separator 114 is let down in pressure in an expansion JT valve 115 to above atmospheric pressure, thereby further chilling the rich solvent to −20° F. to −45° that is then used for chilling the feed gas in heat exchanger 104. The heated rich solvent 29 from heat exchanger 104, typically at 0° F. to −40° F., is then separated in separator 116 at atmospheric pressure to produce a flashed acid gas stream 30.

The atmospheric flashed solvent 31 is expanded via JT valve 117 to vacuum pressure (typically between about 1 psia to about 10 psia) to form stream 32, which is fed to a vacuum stripper 118 that produces an acid gas stream 33 and a lean solvent stream 34. The vacuum stripper preferably includes an upper section and a lower section that are supplied with stripping gas 51 from the flash drum 112 and stripping gas 52 supplied from flash drum 110, respectively. It should be recognized that the number of stripping sections, the stripping gas sources, and/or the quantity of the stripping gases can be varied depending on the feed gas compositions. Furthermore, where the feed gas has a relatively high content of hydrogen sulfide, a third stripping section may be added using a portion of the flash vapor stream 26 from separator 114. Alternatively, a single stripping section is feasible with stripping gas supplied from only one of the flash streams if the feed gas hydrogen sulfide concentration is relatively low. The so produced ultra lean solvent 34 is pumped by lean solvent pump 119 to the absorber pressure for acid gas absorption via compressed ultra lean solvent stream 35. The hydrogen sulfide-containing acid gas 33 may then be compressed via vacuum pump 120 to form compressed acid gas stream 37.

Where enhanced oil recovery or acid gas injection is particularly desirable, it is preferred that contemplated configurations include heat exchanger 109 that is employed to cool the acid gas stream 41 using the depressurized rich solvent stream 17 from the hydraulic turbine 107. In addition, the flashed acid gas 33 is compressed in a vacuum pump 120 to atmospheric pressure, combined with stream 36 to form stream 38, and further compressed in compressor 121. The compressed acid gas stream 39 is cooled to its liquid state (in stream 43) by heat exchangers 122, 123, and 109. An optional trim condenser 124 with external refrigeration (44) may be required to supplement refrigeration duty required by acid gas condensation. Acid gas liquid 43 is then pumped by pump 125 to stream 46 for re-injection for enhanced oil recovery, typically at 4000 psig.

Thus, it should be especially recognized that the carbon dioxide content in the feed gas will provide refrigeration for solvent chilling as well as liquefaction duty of the carbon dioxide stream by the expansion of the rich solvent with hydraulic turbines and JT valves. It should further be appreciated that if additional refrigeration is required (e.g. at relatively low feed pressure), solvent cooling can be supplied by JT cooling with the recycle gas compressor 124 compressing to a higher pressure, cooled in heat exchanger 125 and letdown using JT valve 140 forming a chilled stream 8, and fed to the absorber. Especially suitable alternative configurations of gas processing plants that may be modified to include contemplated configurations according to the inventive subject matter are described in our co-pending international patent application with the serial number PCT/US02/29810, filed Sep. 17, 2002, and which is incorporated by reference herein.

With respect to suitable feed gases, it is contemplated that numerous natural and synthetic feed gases are appropriate. However, particularly preferred feed gases include natural gas, and especially natural gas with a carbon dioxide that is at least about 5 mol %, more typically at least 10 about mol %, and most typically at least 10 to 75 mol %, and with a hydrogen sulfide content that is at least 50 ppm, more typically at least 500 ppm, and most typically at least 1%. Therefore, especially suitable feed streams include natural gas feed streams from oil and gas fields such as Alaska, Norway, Southeast Asia and Gulf of Mexico. Similarly, the acid gas content (and especially carbon dioxide content) of suitable feed gases may vary and will predominantly depend on the source of the feed gas. It is generally preferred, however, that the acid gas content will be at least about 5 mol %, more typically at least 10 about mol %, and most typically at least 20 to 75 mol %. A typical feed gas composition is given in Table 1 below:

TABLE 1

| COMPONENT | MOL % |
|---|---|
| $N_2$ | 0.88 |
| Carbon Dioxide | 19.14 |
| Hydrogen Sulfide | 0.01 |
| $C_1$ | 72.69 |
| $C_2$ | 5.29 |
| $C_3$ | 1.40 |
| $IC_4$ | 0.22 |
| $NC_4$ | 0.26 |
| $IC_5$ | 0.02 |
| $NC_5$ | 0.01 |
| $C_{6+}$ | 0.08 |

Furthermore, it should be recognized that the pressure of contemplated feed gases may vary considerably, and suitable pressures will range between atmospheric pressure and several thousand psig. However, it is particularly preferred that the feed gas has a pressure of at least 400 psig, more typically at least 1000 psig, even more typically at least 3000 psig, and most typically at least 5000 psig. Moreover, while it is generally contemplated that at least a portion of the feed gas pressure is due to the pressure of the gas contained in the well, it should also be recognized that where appropriate, the pressure may also be increased using one or more compressors.

In yet further aspects of the inventive subject matter, contemplated feed gases are preferably dried and cooled before entering the absorber, and it is especially preferred that the cooling of the feed gas will be at least in part effected by the product gas (i.e., the absorber overhead stream) in one or more heat exchangers. With respect to the degree of cooling, it is generally contemplated that the feed gas may be cooled to various temperatures. The cooled feed gas stream may then be fed into a separator in which at least a portion of the C5+ components contained in the feed gas is removed from the cooled feed stream to form a partially C5+ depleted dehydrated feed gas.

The so formed partially dehydrated feed gas may then be further treated to remove higher hydrocarbons (e.g., $C_6^+$) and then still further dehydrated in a dehydration unit (all known gas dehydration units are suitable for use). For example, further dehydration may be performed using glycol or molecular sieves. Dehydration of the feed is particularly advantageous because the absorption process can be run at significantly lower temperature without freezing problems. Moreover, the product gas and the carbon dioxide are produced in a very dry state that eliminates any downstream dehydration of the product gases and minimize hydrocarbon condensation.

Therefore, it should be particularly recognized that suitable absorbers will operate at relatively high pressure, and especially contemplated high pressures are at least 500 psi, typically at least 1000 psi, even more typically at least 3000 psi, and most typically at least 5000 psi. Consequently, it should be recognized that contemplated absorbers may operate in a gas phase supercritical region. The term "operate in a gas phase supercritical region" as used herein refers to operation of the absorber under conditions in which at least a portion of the feed gas, if not all of the feed gas, will be in a supercritical state. Furthermore, by operating the absorption process in the gas phase supercritical region, hydrocarbon condensation is typically avoided, which currently presents a significant problem in heretofore known processes. In yet further contemplated aspects, the type of absorber need not be limited to a particular configuration, and all known absorber configurations are deemed suitable for use herein. However, particularly preferred contacting devices include a packed bed or tray configurations.

With respect to the solvent employed in contemplated absorbers, it should be recognized that all physical solvents and mixtures thereof are appropriate. There are numerous physical solvents known in the art, and exemplary preferred physical solvents include propylene carbonate, tributyl phosphate, normal methylpyrrolidone, dimethyl ether of polyethylene glycol, and/or various polyethylene glycol dialkyl ethers. Alternatively, other solvents including enhanced tertiary amine (e.g., piperazine) or other solvent or a mixture of solvents may be employed having similar behavior as physical solvent.

Consequently, the absorber will provide a product gas that is depleted from acid gases, and particularly depleted from carbon dioxide. Moreover, it should be recognized that since the absorber receives a cooled and dehydrated feed gas, the product gas would typically conform to all or almost all sales gas specifications and requirements for transportation through high-pressure pipelines. It should further be especially appreciated that the rich solvent formed in the absorber may leave the absorber bottom at relatively high pressure (e.g., at least 500 psi, more typically between 1000 and 3000 psi), and may thus be utilized to provide work (e.g., for generation of electrical energy) and/or cooling of various streams in the separation process.

In especially preferred configurations, the rich solvent is let down in pressure using a first hydraulic turbine to generate mechanical or electric energy, and the depressurized rich solvent is then separated in a separator into a hydrocarbon-containing first recycle stream and a first rich solvent, which is subsequently (optionally) employed as a coolant to refrigerate a carbon dioxide stream for the enhanced oil recovery application (wherein the carbon dioxide is produced from the feed gas). The hydrocarbon-containing first recycle stream is preferably recycled to the absorber, while the first rich solvent is further depressurized using a second hydraulic turbine to further generate mechanical or electric energy. The so further depressurized rich solvent stream is then employed as a refrigerant in a heat exchanger (preferably side cooler of the absorber) that cools the semi-rich solvent in the absorber to maintain a desirable absorber temperature. After passing through the heat exchanger, the further depressurized rich solvent stream is then separated in a second separator into a second rich solvent and a second hydrocarbon-containing recycle stream that is recycled to the absorber. From the second separator, the rich solvent stream is further depressurized by a JT valve and then separated in a third separator into a third rich solvent and a third hydrocarbon-containing recycle stream that is recycled to the absorber. The third depressurized rich solvent is then further depressurized to atmospheric pressure, generating refrigeration that is to be used to cool the feed gas, maintaining the absorber at a desirable low bottom temperature.

With the refrigeration mostly provided by depressurizing the rich solvent, refrigeration is not required in most cases (particularly in high feed pressure operation), but may be supplemented internally by JT cooling created from the recycle gas cooler and JT valve, or by an external source using an exchanger with a refrigerant Furthermore, the particular heat exchanger sequence may vary depending on the feed gas, solvent circulation and the carbon dioxide liquefaction duty requirements. For example, the first depressurized rich solvent may be used to chill the feed gas instead of the carbon dioxide stream, and the second depressurized rich solvent may be used for condensation of the carbon dioxide stream instead of the side cooler, and third depressurized rich solvent cooler may be used for side cooler at the absorber instead. Consequently, in preferred configurations a lean solvent is formed at higher temperatures with desirable thermal physical properties that enhance the hydrodynamic performance of the absorption process, and a rich solvent at the lowest possible temperature that maximizes carbon dioxide holding capacity of the solvent. Therefore, contemplated processes will result in lower solvent circulation, lower methane and hydrocarbons losses, and lower energy consumption than currently known solvent based acid gas removal processes.

Flashing of the rich solvent may be performed in various configurations, and it is generally contemplated that all known configurations are suitable for use herein. However, it is typically preferred that the rich solvent (after providing work and/or cooling) is further let down in pressure to a pressure sufficient to release at least 70% (more typically at least 90%, and most typically at least 95%) of the dissolved carbon dioxide. The so produced carbon dioxide is then separated in a separator (typically operating at atmospheric and sub-atmospheric pressure) from the lean solvent. It should be especially appreciated that the so generated carbon dioxide stream has a carbon dioxide content of over 90%, and more typically of at least 95%. Thus, the so formed carbon dioxide stream is especially suited to be employed in enhanced oil recovery process.

In still further contemplated aspects of the inventive subject matter, the lean solvent from the separator is further let down in pressure via JT valve and fed into a vacuum separator. Preferred vacuum separators operate at a pressure of between about 1 to 10 psia, which may be generated by a liquid seal vacuum pump. Residual carbon dioxide (typically with a purity of at least 95%) from the lean solvent is removed in the vacuum separator and may also be employed in enhanced oil recovery or acid gas injection. The physical solvent is then regenerated under a deep vacuum stripper with stripping gas supplied from the flash drums and recirculated to the absorber via a lean solvent pump. In particularly preferred configurations, the vacuum separator may use a lean gas (e.g., a portion of the product gas) as a stripping gas to produce an ultra lean solvent. However, in alternative configurations, various gases, including the product gas are also suitable, as well as gases from other streams within the plant and even nitrogen or air. It should be further appreciated that the use of a vacuum stripper in such configurations produces a very lean solvent capable of producing a treated gas with a carbon dioxide concentration of typically less than 1000 ppmv, and hydrogen sulfide concentration of less than 4 ppm. Therefore, the term "ultra-lean solvent" as used herein refers to a solvent that contains no more than 10 ppm hydrogen sulfide, and most typically no more than 4 ppm hydrogen sulfide.

Thus, contemplated configurations will provide pipeline quality gas at high pressure and a carbon dioxide liquid stream, which can be used for enhanced oil recovery, wherein refrigeration is generated from successive depressurization of rich solvents. In especially preferred configurations, contemplated acid gas removal plants may operate without external refrigeration, and at higher pressure, such configurations will produce refrigeration that can be used to condense carbon dioxide for further use in enhanced oil recovery. Besides providing refrigerant for removing the heat of absorption from the absorber, the successive depressurization will return the flash vapors containing methane and hydrocarbons to the absorber which are substantially fully recovered during the recycle process. Moreover, product gas from the absorber and depressurized solvent at atmospheric pressure are employed to cool feed gas to the absorber maintaining the absorber bottom in a desirable low temperature range. It is therefore contemplated that the heat exchange configuration produces an absorber temperature profile with either very close to isothermal or with a decreasing temperature profile, resulting in favorable physical properties that improves the column hydrodynamic performance and absorption efficiency.

In particularly preferred configurations and where the feed gas comprises natural gas, it should be appreciated that the product gas comprises at least 90%, more typically at least 95%, and most typically at least 99% of the natural gas present in the feed gas. While not wishing to be bound be any theory or hypothesis, it is contemplated that such relatively high natural gas recovery in the product gas is achieved by providing at least one, and more preferably three hydrocarbon-containing recycle streams back to the absorber, and/or by operating the absorber under isothermal or a decreasing top-to-bottom thermal gradient. Suitable recycle gas compressors are all compressors that are capable of compressing the first and second hydrocarbon-containing recycle gas streams to a pressure equal or about the pressure of the cooled and dehydrated feed gas. Similarly, it is contemplated that the lean solvent pump will provide solvent pressure suitable for introduction of the lean solvent into the absorber.

Consequently, it is contemplated that configurations according to the inventive subject matter will significantly reduce overall energy consumption and capital cost as compared to conventional carbon dioxide removal processes at high carbon dioxide partial pressure using amine or other physical solvents or membranes. Moreover, contemplated configurations and processes will generally not require an external heat source or refrigeration, thereby further reducing energy consumption. Still further, enhanced oil recovery projects will frequently encounter an increase in carbon dioxide concentration in the feed gas, typically from 10% up to as high as 60%. Contemplated configurations and processes can accommodate these changes with essentially same solvent circulation.

A further advantage of contemplated configurations is that the process is generally a non-corrosive process due to operation at low temperature and the absence of water in the physical solvent. In contrast, conventional amine units for carbon dioxide removal are generally more complex to operate and maintain as such processes tend to be corrosive and often require antifoam and anti-corrosion injections during operation. Still further, another advantage of contemplated physical solvent processes is that, unlike amine processes, the solvent circulation rate is less sensitive to increases in carbon dioxide partial pressure as the carbon dioxide loading in the rich solvent merely increases with increasing carbon dioxide concentration in the feed gas. In an amine unit design, the amine circulation rate would need to be increased linearly with increasing carbon dioxide content.

Yet another advantage of contemplated physical solvent processes is their simplicity and resistance to freezing compared to known amine treating processes, thus requiring less supporting offsites and utility systems, such as steam boilers. For example, contemplated configurations operating a high carbon dioxide feed gas may not require any cooling duty as the flashing of carbon dioxide from the rich solvent will provide the necessary cooling and regeneration. The inventors further contemplate that operation of a plant with vacuum regeneration assisted with stripping gas can achieve residual carbon dioxide and hydrogen sulfide content at a very low level.

Consequently, contemplated plants will include a vacuum stripper that receives a lean hydrogen sulfide-containing physical solvent and in which substantially hydrogen sulfide-free stripping gas is provided by at least one of a high-pressure flash vessel and a medium pressure flash vessel. The term "lean hydrogen sulfide-containing physical solvent" as used herein refers to a physical solvent from which at least a portion of acid gas (typically carbon dioxide) contained in the physical solvent has been removed in a flash process, and which contains at least 100 ppm hydrogen sulfide, and more typically at least 200 ppm hydrogen sulfide. As further shown herein, the term "substantially hydrogen sulfide-free stripping gas" refers to a stripping gas that contains less than 1000 ppm, and more typically less than 10 ppm hydrogen sulfide. It should further be recognized that where plant configurations employ only one flash vessel, the flash vessel may operate as high-pressure flash vessel or medium pressure flash vessel.

In especially preferred configurations, the lean hydrogen sulfide-containing physical solvent comprises at least 100 ppm hydrogen sulfide, and the vacuum stripper produces from the lean hydrogen sulfide-containing physical solvent an ultra-lean solvent comprising less than 100 ppm hydrogen sulfide, and most preferably an ultra-lean solvent comprising less than 10 ppm hydrogen sulfide. While all physical solvents (and non-physical solvents following Henry's law) are generally contemplated suitable for use herein, especially preferred physical solvents include FLUOR SOLVENT™ (propylene carbonate), NMP (normal-methyl pyrolidone), SELEXOL™ (dimethyl ether of polyethylene glycol), and TBP (tributyl phosphate).

With respect to the stripping gas, it is generally contemplated that the high-pressure flash vessel and/or a medium pressure flash vessel are operated at a temperature and/or pressure that will produce a vapor portion in the vessel that is substantially free of hydrogen sulfide (i.e., contains less than 1000 ppm, and more typically less than 10 ppm hydrogen sulfide). Thus, in most configurations, the substantially hydrogen sulfide-free stripping gas comprises at least 95 mol % carbon dioxide. It should still further be appreciated that the isolated acid gases may advantageously be re-injected into the formation for sequestration and/or enhanced oil recovery. Therefore, suitable plants may comprise a separator in which acid gas is separated from a rich solvent, thereby producing the lean hydrogen sulfide-containing physical solvent, and wherein part of the acid is compressed and injected into a formation, and wherein the vacuum stripper further produces a second acid gas that is combined with the acid gas from the separator.

Thus, specific embodiments and applications for configurations and methods for improved acid gas removal have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant comprising:
    a solvent source that is configured to provide a carbon dioxide-depleted lean hydrogen sulfide-containing physical solvent;
    a vacuum stripper coupled to the solvent source and configured to produce an ultra-lean physical solvent from the carbon dioxide-depleted hydrogen sulfide-containing lean physical solvent; and
    at least one of a high-pressure flash vessel and a medium pressure flash vessel coupled via respective conduits to the vacuum stripper, wherein the conduits and the at least one of the high-pressure flash vessel and the medium pressure flash vessel are configured to provide a substantially hydrogen sulfide-free stripping gas from the at least one of the high-pressure flash vessel and the medium pressure flash vessel to the vacuum stripper.

2. The plant of claim 1 further comprising an absorber that is configured to receive the ultra-lean physical solvent and that is further configured to operate with an isothermal gradient or with a decreasing top-to-bottom thermal gradient.

3. The plant of claim 2 wherein the absorber is configured to receive a feed gas that comprises at least 10 mol % carbon dioxide and at least 500 ppm hydrogen sulfide.

4. The plant of claim 3 wherein the feed gas has a pressure of at least 1000 psig.

5. The plant of claim 4 wherein the feed gas is at least partially dehydrated, and wherein the at least partially dehydrated feed gas is further cooled by a rich solvent.

6. The plant of claim 1 wherein the lean hydrogen sulfide-containing physical solvent comprises at least 100 ppm hydrogen sulfide, and wherein the ultra-lean physical solvent comprises less than 100 ppm hydrogen sulfide.

7. The plant of claim 6 wherein the ultra-lean solvent comprises less than 10 ppm hydrogen sulfide.

8. The plant of claim 1 wherein the lean hydrogen sulfide-containing physical solvent is selected from the group consisting of propylene carbonate, n-methyl pyrolidone, dimethyl ether of polyethylene glycol, and tributyl phosphate.

9. The plant of claim 1 wherein the substantially hydrogen sulfide-free stripping gas comprises at least 95 mol % carbon dioxide.

10. The plant of claim 1 wherein the solvent source comprises a separator in which acid gas is separated from a rich solvent, thereby producing the lean hydrogen sulfide-containing physical solvent, and wherein the plant is further configured such that part of the acid gas can be compressed and injected into a formation.

11. The plant of claim 10 wherein the vacuum stripper further produces a second acid gas that is combined with the acid gas from the separator.

12. A method of producing an ultra-lean physical solvent, comprising:
    separating in at least one of a high-pressure flash vessel and a medium pressure flash vessel a substantially hydrogen sulfide-free stripping gas from a physical solvent;
    further reducing pressure in the physical solvent to remove carbon dioxide and to so form a carbon dioxide-depleted lean hydrogen sulfide-containing physical solvent; and
    feeding the substantially hydrogen sulfide-free stripping gas into a vacuum stripper to thereby strip hydrogen sulfide from the carbon dioxide-depleted lean hydrogen sulfide-containing physical solvent in the vacuum stripper to so form the ultra-lean physical solvent; and
    feeding the ultra-lean physical solvent to an absorber, and operating the absorber with an isothermal gradient or with a decreasing top-to-bottom thermal gradient.

13. The method of claim 12 further comprising a step of feeding a feed gas to the absorber at a pressure of at least 1000 psig, wherein the feed gas comprises at least 10 mol % carbon dioxide and at least 500 ppm hydrogen sulfide.

14. The method of claim 12 wherein the lean hydrogen sulfide-containing physical solvent is selected from the group consisting of propylene carbonate, n-methyl pyrolidone, dimethyl ether of polyethylene glycol, and tributyl phosphate.

15. The method of claim 12 wherein the substantially hydrogen sulfide-free stripping gas comprises at least 95 mol % carbon dioxide.

16. A method of producing an ultra-lean physical solvent, comprising:

producing in an absorber an acid gas enriched physical solvent;

separating in at least one of a high-pressure flash vessel and a medium pressure flash vessel a substantially hydrogen sulfide-free flashed hydrocarbon vapor from the acid gas enriched physical solvent to so produce a flashed solvent;

recycling one portion of the substantially hydrogen sulfide-free flashed hydrocarbon vapor to the absorber, and using another portion of the substantially hydrogen sulfide-free flashed hydrocarbon vapor as a stripping gas;

further reducing pressure of the flashed solvent and separating the pressure-reduced flashed solvent into a carbon dioxide stream and a carbon dioxide-depleted lean hydrogen sulfide-containing physical solvent; and stripping hydrogen sulfide from the carbon dioxide-depleted lean hydrogen sulfide-containing physical solvent in a vacuum stripper using the stripping gas to so form the ultra-lean physical solvent.

17. The method of claim 16 wherein the step of separating is performed in the high-pressure flash vessel and the medium pressure flash vessel.

* * * * *